United States Patent
Ammann et al.

(10) Patent No.: US 8,106,816 B2
(45) Date of Patent: Jan. 31, 2012

(54) METHOD OF DETERMINING THE POSITION OF A MOBILE DEVICE

(75) Inventors: Daniel Ammann, Schindellegi (CH); Etienne Favey, Dielsdorf (CH); Christoph Schmid, Zürich (CH)

(73) Assignee: u-blox AG, Thalwil (CH)

( * ) Notice: Subject to any disclaimer, the term of this patent is extended or adjusted under 35 U.S.C. 154(b) by 152 days.

(21) Appl. No.: 12/568,368

(22) Filed: Sep. 28, 2009

(65) Prior Publication Data

US 2010/0302096 A1 Dec. 2, 2010

(30) Foreign Application Priority Data

May 27, 2009 (EP) .................................. 09405088

(51) Int. Cl.
*G01S 19/24* (2010.01)
*G01S 19/42* (2010.01)

(52) U.S. Cl. ............... 342/357.25; 342/357.63; 342/451; 342/458

(58) Field of Classification Search ............ 342/357.25–357.27, 357.43, 357.63, 357.66, 357.69, 357.75–357.77, 450–452, 458; *G01S 19/24, 19/42, G01S 19/44*
See application file for complete search history.

(56) References Cited

U.S. PATENT DOCUMENTS

| | | | |
|---|---|---|---|
| 5,731,786 A * | 3/1998 | Abraham et al. | 342/357.25 |
| 6,473,694 B1 | 10/2002 | Akopian | |
| 6,788,249 B1 * | 9/2004 | Farmer et al. | 342/357.62 |
| 6,944,540 B2 * | 9/2005 | King et al. | 701/213 |
| 2003/0156058 A1 * | 8/2003 | Edwards et al. | 342/357.04 |
| 2004/0104840 A1 | 6/2004 | Awata | |
| 2006/0250302 A1 * | 11/2006 | Park et al. | 342/357.1 |
| 2007/0152878 A1 * | 7/2007 | Wang et al. | 342/357.06 |
| 2007/0205942 A1 * | 9/2007 | Xie et al. | 342/357.13 |

OTHER PUBLICATIONS

European Search Report for European Patent Application EP 09 40 5088, 2 pages, dated Nov. 6, 2009.

* cited by examiner

*Primary Examiner* — Thomas Tarcza
*Assistant Examiner* — John Vigushin
(74) *Attorney, Agent, or Firm* — Edward B. Weller

(57) ABSTRACT

A set of device parameters consisting of clock bias and position of a mobile device is determined without previous knowledge of the week number (WN) in that solutions of a set of equations derived from a least squares type weight function involving pseudoranges related to the device parameters via basic equations are attempted with a time of week (TOW) extracted from satellite signals and various week number candidates. A solution algorithm which iteratively solves the set of equations is used, each iteration step involving a linearization of the latter and resulting in corrections of the device parameters. After elimination of week numbers where the solution algorithm does not yield a solution a valid week number is selected from the remaining week numbers in that a deviation value is determined which reflects differential terms, i.e., differences between pseudorange values as measured and as derived from the set of device parameters according to the solution, e.g., by evaluation of the weight function. The week number yielding the smallest deviation value is selected. If the week number is confirmed by various checks the device parameters according to the corresponding solution are used, e.g., displayed, by the mobile device.

15 Claims, 1 Drawing Sheet

METHOD OF DETERMINING THE POSITION OF A MOBILE DEVICE

RELATED APPLICATION

This application claims the benefit of priority under 35 USC §119 to EP Patent Application No. 09 405 088.7 filed on May 27, 2009, the entire contents of which are incorporated herein by reference.

FIELD OF THE INVENTION

The method according to the invention allows for determining the position of a mobile device based on signals from satellites of a Global Navigation Satellite System (GNSS), in particular, the Global Positioning System (GPS).

PRIOR ART

In prior art methods, the week number which is a component of GPS time that, together with the time of week, must be known for a determination of the position of a mobile device is usually extracted from satellite signals containing data organized as consecutive frames which are in turn made up by consecutive subframes. As the week number is, contrary to the time of week which is encoded in every one of the five subframes making up a frame, only contained in the first subframe this may take up to about thirty seconds, the time required for the transmission of a complete frame. At a cold start with valid satellite orbit data having to wait until the time of week data have been received may increase the time to first fix by a similar time span.

SUMMARY

It is an object of the invention to provide a method for determining the position of a mobile device where a first fix can be arrived at without previous knowledge of the week number which needs therefore not be extracted beforehand from the satellite signals. In the case of a cold start where, however, the satellite trajectories can be derived from orbit data stored in the mobile device, this reduces the time to first fix by up to about twenty-four seconds and by about twelve seconds on average as only the time of week which is transmitted every six seconds may be extracted from the satellite signals.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

BRIEF DESCRIPTION OF THE DRAWINGS

In the following the invention is described in more detail with reference to a drawing.

DETAILED DESCRIPTION

Figure 1:
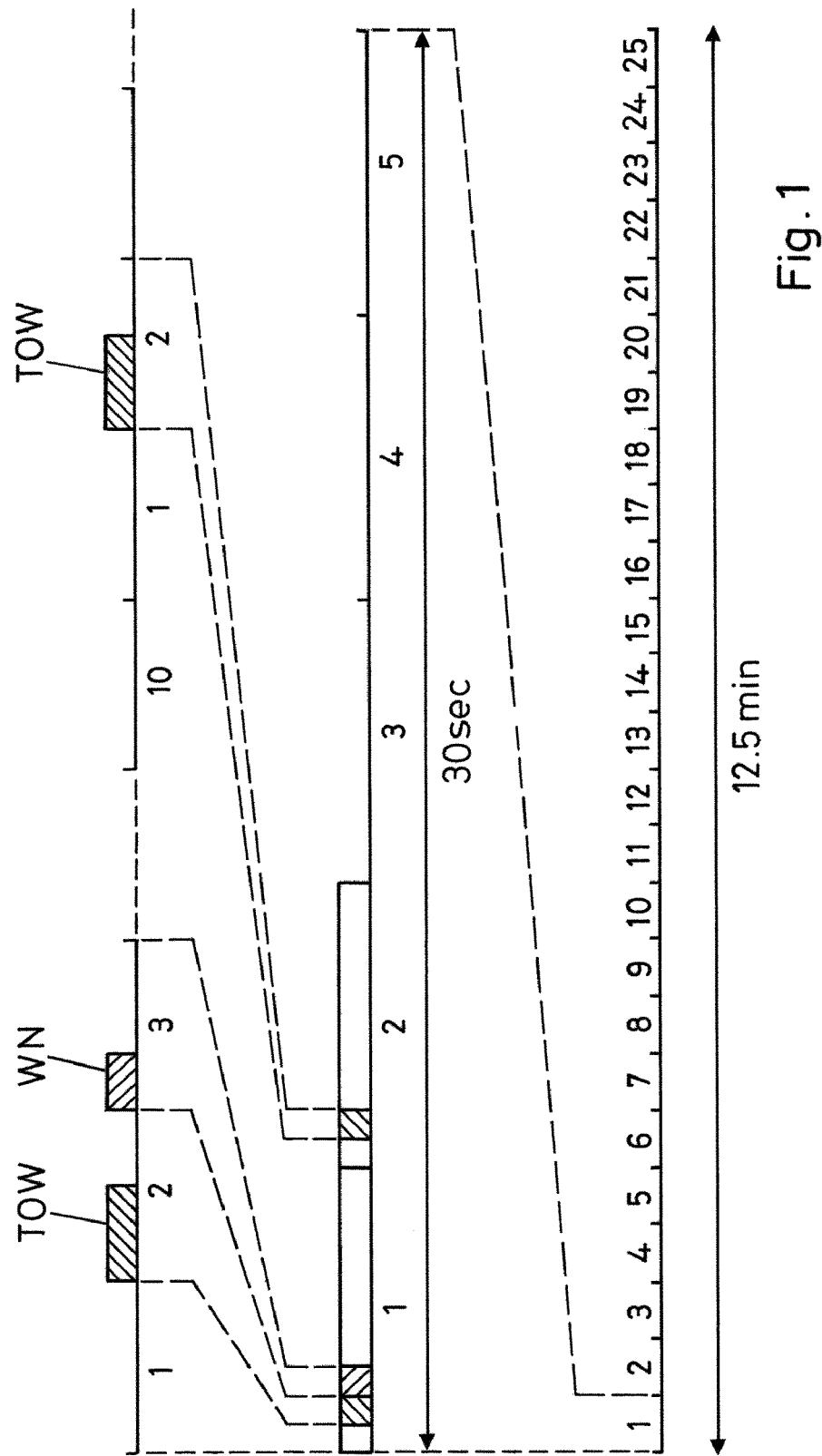
FIG. 1 shows diagrammatically the structure of the set of data transmitted by any of the GPS satellites.

Every one of the satellites pertaining to the Global Positioning System (GPS) continuously sends repetitions of a characteristic 1,023 bit binary sequence which takes up one millisecond. Data bits are superposed in that twenty consecutive copies of the characteristic sequence are sent with or without inversion indicating a +1 value of the data bit in the latter case and a data bit value of −1 in the first case. Accordingly, the transmission of a data bit takes 20 milliseconds and the data bit rate is 50 bits per second.

Transfer of a complete data set from a satellite which comprises almanac data defining the trajectories of all GPS satellites as functions of time, ephemeris data of the transmitting satellite defining its trajectory with higher precision but for a much shorter time interval than the almanac data, etc., takes 12.5 minutes, the data set comprising (FIG. 1) 25 frames of 30 seconds each. Every frame comprises 5 subframes of 6 seconds each of which is made up of ten 30 bit words. The second word of every subframe is a hand-over word whose first 17 bits encode the time of week TOW, i.e., the time of transmission of the beginning of the subsequent subframe. Only the first subframe of every frame contains, at the beginning of the third word, the week number WN as a ten bit number, that is, the number of the week from the beginning of the GPS system modulo 1,024.

A mobile device or receiver whose position is to be determined will receive the signals of all satellites which are in view—usually at least four and normally more than four—and extract the necessary data from them. At the same time, the device will determine the code phases of the satellite signals with respect to its own time as measured by an oscillator. From the positions of the satellites as derived from the extracted data and from the code phases a position of the mobile device can be determined by resolving the millisecond integer ambiguities of the signals by methods known in the art and thereby establishing 'measured' pseudoranges and afterwards solving a system of equations containing the measured pseudoranges for a set of device parameters comprising clock bias and the three components of the position of the mobile device using a solution algorithm.

The positions of the satellites can be derived from orbit data like almanac data or, preferably, other, more precise, long term data or even ephemeris data defining the satellite trajectories and stored in the mobile device as soon as GPS system time is known which consists of the time of week TOW and the week number WN. With GPS time the position of each satellite at the time of transmission can be derived by evaluating the orbit data which define the satellite trajectory as a function of time.

A time shift of one week is essentially tantamount to a time shift of 27 minutes and 32 seconds in its effect on shifts in GPS satellite positions which, with satellite velocities of about 3,000 meters/sec, are of the order of 5,000 kilometers. As a consequence, a large error in the determined position of the mobile device or receiver will ensue if the week number is wrong. In many cases the solution algorithm will not yield a solution at all.

Assuming that the clock bias is unknown, the solution is over-determined where five or more satellites are in view. Consequently, it is normally established by a least squares or similar method, starting from basic equations which relate the pseudoranges $\rho^s$ to the set of device parameters, that is, a vector $x^R=(x_0^R, x_1^R, x_2^R, x_3^R)$ usually consisting of the clock bias $x_0^R$ and the components $x_1^R, x_2^R, x_3^R$ of the spatial position of the device in a Euclidean coordinate system at the time the signal is received:

$$\rho^s(x^R)=r^s+x_0^R \qquad (1)$$

where $$r^s=\sqrt{[(x_1^s-x_1^R)^2+(x_2^s-x_2^R)^2+(x_3^s-x_3^R)^2]} \qquad (2)$$

is the distance between the satellite s at the time it emits the signal and the mobile device at the time it receives it. Like the components of the spatial position, the clock bias is in meters, e.g., in seconds times the speed of light in meters/second. Satellite clock bias is considered negligible.

With $R^s$ the measured pseudorange of satellite s as determined from the code phase measurement we can define differential terms $$d^s(\underline{x}) = R_s - \rho^s(\underline{x}) \qquad (3)$$

as functions of the set of device parameters x which is now considered as a variable.

From equations (1) and (2), we have $$\frac{\partial \rho^s}{\partial x_0}(\underline{x}) = 1, \quad \frac{\partial \rho^s}{\partial x_i}(\underline{x}) = -\frac{x_i^s - x_i}{r_s}, \quad i = 1, 2, 3 \qquad (4)$$

and $$\frac{\partial d^s}{\partial x_0}(\underline{x}) = -1, \quad \frac{\partial d^s}{\partial x_i}(\underline{x}) = -\frac{x_i^s - x_i}{r_s}, \quad i = 1, 2, 3 \qquad (5)$$

One can now, according to methods well known in the art, form a weight function $$W(\underline{x}) = \sum_{s_1,s_2=1}^{m} p_{s_1 s_2} d^{s_1}(\underline{x}) d^{s_2}(\underline{x}) \qquad (6)$$

which assigns a certain weight to a value of the set x of device parameters which depends on the differential terms $d^s(x)$, i.e., the differences between the measured pseudoranges $R^s$ and the pseudoranges $\rho^s(x)$ calculated from the said value. The solution $x^R$ is defined as the set of device parameters x where $W(x)$ is minimal. $p_{s_1 s_2}$, where $s_1$ and $s_2$ vary over the m in-view satellites, is the weight matrix, i.e., the inverse of the covariance matrix of the pseudorange measurements. Usually, it is assumed that there are no cross-correlations between the measurements and that the weight matrix is diagonal. In that case we have $$p_{ss} = p_s = 1/\sigma_s^2 \qquad (7)$$

where $\sigma_s$ is the standard deviation of the differential term $d^s(x)$ of satellite s which may either depend on satellite health data, elevation and other parameters or be a constant. Equation (6) then reduces to $$W(\underline{x}) = \sum_{s=1}^{m} p_s d^s(\underline{x})^2 \qquad (6')$$

That $W(x)$ be minimal, i.e., has an extremum, at $x^R$ implies that $$\frac{\partial W}{\partial x_i}(\underline{x}^R) = \sum_{s_1,s_2=1}^{m} p_{s_1 s_2}\left[\frac{\partial d^{s_1}}{\partial x_i}(\underline{x}^R) d^{s_2}(\underline{x}^R) + d^{s_1}(\underline{x}^R)\frac{\partial d^{s_2}}{\partial x_i}(\underline{x}^R)\right] = 0 \qquad (8)$$

Starting with an estimate $x^0$ for the set of device parameters as a first intermediate solution, a new intermediate solution can be derived in a first iteration step. For that purpose, the dependence of the pseudoranges on the parameter set is linearized:

$$\rho^s(\underline{x}) = \rho^{s0} + \sum_{i=0}^{3} A_{si}\Delta_i \qquad (9)$$

where $$\rho^{s0} = \rho^s(x^0), \quad A_{si} = \frac{\partial \rho^s}{\partial x_i}(x^0) \text{ and } \Delta_i = x_i - x_i^0.$$

With $d^{s0} = R^s - \rho^{s0}$ this leads to $$d^s(\underline{x}) = d^{s0} - (\rho^s(\underline{x}) - \rho^{s0}) = d^{s0} - \sum_{i=0}^{3} A_{si}\Delta_i; \qquad (10)$$

and $$\frac{\partial W}{\partial x_i}(\underline{x}) = \sum_{s_1,s_2=1}^{m} p_{s_1 s_2}[A_{s_1 i} d^{s_2}(\underline{x}) + d^{s_1}(\underline{x}) A_{s_2 i}] \qquad (11)$$

$$= -2\sum_{s_1,s_2=1}^{m} p_{s_1 s_2} A_{s_1 i} d^{s_2}(\underline{x})$$

and from equations (8) and (10)

$$\sum_{s_1=1}^{m} A_{s_1 i}\sum_{s_2=1}^{m} p_{s_1 s_2}\sum_{j=0}^{3} A_{s_2 j}\Delta_j = \sum_{s_1=1}^{m} A_{s_1 i}\sum_{s_2=1}^{m} p_{s_1 s_2} d^{s_2 0} \qquad (12)$$

follows and with $$N_{ij} = \sum_{s_1=1}^{m} A_{s_1 i}\sum_{s_2=1}^{m} p_{s_1 s_2}\sum_{j=0}^{3} A_{s_2 j}, \qquad (13)$$

$$Z_i = \sum_{s_1=1}^{m} A_{s_1 i}\sum_{s_2=1}^{m} p_{s_1 s_2} d^{s_2 0}$$

can be represented as $$\sum_{j=0}^{3} N_{ij}\Delta_j = Z_i \qquad (14)$$

which can be solved for the corrections $\Delta_j$.

If cross-correlations between the pseudorange measurements are absent, equation (6') can be used and the expressions (13) reduce to $$N_{ij} = \sum_{s=1}^{m} A_{si} p_s \sum_{j=0}^{3} A_{sj}, \quad Z_i = \sum_{s=1}^{m} A_{si} p_s d^{s0} \qquad (13')$$

In any case a new intermediate solution can then be defined by $$x^1 = x^0 + \Delta, \text{ with } \Delta = (\Delta_i)_{i=0,\ldots,3} \qquad (15)$$

which can then serve as the previous intermediate solution in a next iteration step. In this way the system of equations (8) can be solved iteratively where at each iteration step every component of the previous intermediate solution is replaced by the sum of the corresponding component of the previous intermediate solution and the corresponding correction:

$$x^{n+1} = x^n + \Delta \quad (16)$$

If this solution algorithm converges, the last of the new intermediate solutions is considered the solution $x^R$ of the system of equations (8).

As the week number is not known beforehand, finding a solution of the said system of equations is attempted with a plurality of week number candidates. Normally the latter will form a sequence of consecutive week numbers, e.g., fill an interval centered around or extending from an estimated week number.

With any of the week number candidates and the time of week which together define GPS time, iteration can run up to a previously defined maximum number $n_{max}$ of steps with, e.g., $n_{max}=10$, or until, according to some previously defined norm, e.g., a maximum norm or Euclidean norm, the difference between the parameter vector $x^n$ of the previous intermediate solution and the parameter vector $x^{n+1}$ of the new intermediate solution derived from it are smaller than a predefined threshold:

$$\|\Delta\| \leq \epsilon \quad (17)$$

If the maximum number of steps is reached without the condition (17) being fulfilled, it is concluded that the solution algorithm did not yield a solution and the week number candidate is eliminated.

If the solution algorithm has yielded a solution $x^R$ with each of a plurality of week numbers, a single valid week number is selected from them. This can be done using a deviation function which reflects the differences of the pseudoranges as calculated from the set of device parameters and the measured pseudoranges and evaluating it at the solution $x^R$ in order to derive a deviation value and then select the week number where the deviation value D is smallest. A preferred deviation function is the weight function W(x) of equation (6) or equation (6') from which the deviation value is derived as $$D = W(x^R) \quad (18)$$

Another possible choice is the mean $\bar{d}$ of the differential terms $d^s(x^R)$. They may, of course, both be taken into consideration.

It is in any case advisable to carry out further validity checks whose results do or do not confirm the valid week number. For instance, the smallest deviation value which is associated with the valid week number can be compared to a threshold and the valid week number and the solution based on it only confirmed if the deviation value is smaller than the threshold. Alternatively, the smallest deviation value can be compared with the next smallest and the week number confirmed only if, e.g., the first divided by the latter yields a quotient that is smaller than a threshold. Instead of the second smallest deviation value a mean of the remaining deviation values can be used. Thresholds can be fixed or depend on parameters like number of visible satellites and signal strengths.

In cases where the position of the mobile device can be delimited a priori, it is also possible to check whether the position according to the solution is within a plausible range defined a priori, in particular, sufficiently close to a plausible estimated position and to only confirm the valid week number and the solution if the distance from the estimated position is below a certain threshold. It is, of course, also possible to combine several checks.

If the valid week number is confirmed, the corresponding set of device parameters is used, e.g., displayed, by the device. If it is not confirmed, the device parameters of the corresponding solution are discarded. A new search with a different set of week number candidates can then be carried out. Should all attempts fail, the week number is extracted from the satellite signals after all.

A determination of a set of device parameters has been simulated where the mobile device was located at 8.56° longitude, 47.28° latitude and 550 meters altitude. The initial estimate for the position, e.g., the first intermediate solution, was 0° longitude, 0° latitude and 0 meters altitude. Eight rather strong satellite signals were assumed to be present. Long term data stored in the device were used for calculating satellite positions. Week number candidates were 501, 502 and 503, corresponding to weeks 1,525, 1,526 and 1,527, respectively, from the beginning of GPS time.

In the table below, the corrections arrived at in the first five iteration steps are listed for week number candidate 501:

|  | iteration | | | | |
| --- | --- | --- | --- | --- | --- |
| correction | 1 | 2 | 3 | 4 | 5 |
| $\Delta_0$ | 2'571'078 | 1'491'119 | 314'837 | 316'974 | 317'000 |
| $\Delta_1$ | 1'820'461 | 137'097 | 3'581 | 48 | 0 |
| $\Delta_2$ | 132'593 | 14'465 | 322 | 7 | 0 |
| $\Delta_3$ | 3'174'010 | 327'983 | 7'962 | 119 | 0 |

After 5 iteration steps, the spatial coordinates have converged, but the correction $\Delta_0$ to clock bias $x_0$ is still large, and there is no indication that it will shrink to a value close to zero as it should for the week number and the solution based on it to be valid. The solution algorithm apparently does not converge. The week number 501 is therefore eliminated.

With week number candidate 502 the corrections show a similar pattern:

|  | iteration | | | | |
| --- | --- | --- | --- | --- | --- |
| correction | 1 | 2 | 3 | 4 | 5 |
| $\Delta_0$ | 774'005 | 110'284 | 89'230 | 88'774 | 88'765 |
| $\Delta_1$ | 796'037 | 21'440 | 466 | 8 | 0 |
| $\Delta_2$ | 212'854 | 10'772 | 175 | 4 | 0 |
| $\Delta_3$ | 444'321 | 12'046 | 294 | 5 | 0 |

The solution algorithm does not converge and the week number 502 is also eliminated.

With week number candidate 503, on the other hand, the solution algorithm arrives at a valid solution after three iteration steps and the iteration stops:

|  | iteration | | | | |
| --- | --- | --- | --- | --- | --- |
| correction | 1 | 2 | 3 | 4 | 5 |
| $\Delta_0$ | 82,876 | 1'218 | 0.1 | — | — |
| $\Delta_1$ | 327'942 | 1'492 | 0.2 | — | — |
| $\Delta_2$ | 259'783 | 571 | 0.0 | — | — |
| $\Delta_3$ | 275'584 | 4'517 | 0.5 | — | — |

The solution is found to be valid and week number candidate 503 is selected as the valid week number.

A second simulation where the mobile device position was assumed to be the same as in the above example led to the following results:

Week number candidate 502, corresponding to week 1,526 since the beginning of GPS time:
  No convergence after ten iteration steps. The week number is eliminated.
Week number candidate 503, corresponding to week 1,527:
  Convergence after seven steps. The deviation value D calculated with the weight function according to equation (6') is 254,808.6. The mean $\bar{d}$ of the differential terms $d_s(x^R)$ is 482,148.2.
Week number candidate 504, corresponding to week 1,528:
Convergence after four iteration steps. D=0.12, $\bar{d}$=841.6. Week number 504 was selected as the valid week number from the remaining week number candidates 503 and 504.

The mobile device may include the GNSS receiver described in U.S. Published Patent Application No. US2008/0063123 or U.S. Published Patent Application No. US2008/0240315, which are incorporated herein by reference in their entirety.

Some portions of the detailed description that follows are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps (instructions) leading to a desired result. The steps are those requiring physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations of physical quantities as modules or code devices, without loss of generality.

However, all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or "determining" or "checking" or the like, refer to the action and processes of a computer system, or similar electronic computing device, that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention could be embodied in software, firmware or hardware, and when embodied in software, could be downloaded to reside on and be operated from different platforms used by a variety of operating systems.

The present invention also relates to an apparatus or mobile device for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and displays presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will appear from the description. In addition, the present invention is not described with reference to any particular programming language. It will be appreciated that a variety of programming languages may be used to implement the teachings of the present invention as described herein, and any references to specific languages are provided for disclosure of enablement and best mode of the present invention.

In addition, the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the claims.

While particular embodiments and applications of the present invention have been illustrated and described herein, it is to be understood that the invention is not limited to the precise construction and components disclosed herein and that various modifications, changes, and variations may be made in the arrangement, operation, and details of the methods and apparatuses of the present invention without departing from the spirit and scope of the invention as it is defined in the appended claims.

What is claimed is:

1. A method of determining a set of device parameters defining the position of a mobile device from signals received from satellites pertaining to a global navigation satellite system, where code phases of said signals are assessed and the position of the mobile device is derived from said code phases and a system time of the global navigation satellite system comprising a week number (WN) and a time of week (TOW) and assumptions on the trajectories of said satellites which depend on said system time, by resolving a system of equations using a solution algorithm, the method comprising:

solving the system of equations by using the solution algorithm for each of a plurality of attempts with a system time comprising one of a plurality of week number candidates, selecting a valid week number from among the plurality of week number candidates by eliminating at least any week number candidate where the application of the solution algorithm has not yielded a solution, assigning a deviation value to any remaining week number and selecting the valid week number from among the remaining week numbers according to the deviation value, and designating the solution of the system of equations based on the valid week number as the determined set of device parameters.

2. The method of claim 1, wherein the week number candidate having the absolute value of the deviation value that is smallest is selected as the valid week number.

3. The method of claim 1, wherein the system of equations is based on equations defining the dependence of a pseudorange between each one of the satellites and the mobile device on the set of device parameters.

4. The method of claim 1, wherein the solution of the system of equations is in each case a set of device parameters where an absolute value of a deviation function which depends on said set has a minimum and the deviation value reflects the value of the deviation function at said set of device parameters.

5. The method of claim 3, wherein the solution of the system of equations is in each case a set of device parameters where an absolute value of a deviation function which contains differential terms each corresponding to the difference of the value of the pseudorange between one of the satellites and the mobile device as derived from the assessed code phases and the value of said pseudorange as derived from the set of device parameters of the mobile device via the basic equations has a minimum and the deviation value reflects the value of the deviation function at said set of device parameters.

6. The method of claim 5, wherein the deviation function is proportional to a sum of weighted squares of said differential terms.

7. The method of claim 4, wherein the solution algorithm includes searching for an extremum of the deviation function by solving for a position where the gradient of the deviation function is zero.

8. The method of claim 7, wherein the solution algorithm comprises at least one iteration step of solving a linearized version of the system of equations for a correction to a previous intermediate solution and replacing the previous intermediate solution replaced by a new intermediate solution which contains the correction.

9. The method of claim 1, wherein the week number candidates fill an interval of consecutive week numbers.

10. The method of claim 1, further comprising subjecting the valid week number to at least one further check and using the corresponding solution only if the at least one check has confirmed the valid week number.

11. The method of claim 10, wherein the at least one check comprises one or more of the following steps:
comparing the corresponding deviation value with a first threshold,
comparing the relation between the corresponding deviation value and a term derived from at least one deviation value corresponding to a remaining week number candidate with a second threshold, and
checking whether the position of the device according to the corresponding solution is within a plausible range defined a priori.

12. A machine-readable medium encoded with instructions, that when executed by one or more processors, cause the one or more processors to carry out a process for determining a set of device parameters defining the position of a mobile device from signals received from satellites pertaining to a global navigation satellite system, where code phases of said signals are assessed and the position of the mobile device is derived from said code phases and a system time of the global navigation satellite system comprising a week number (WN) and a time of week (TOW) and assumptions on the trajectories of said satellites which depend on said system time, by resolving a system of equations using a solution algorithm, the process comprising:
solving the system of equations by using the solution algorithm for each of a plurality of attempts with a system time comprising one of a plurality of week number candidates,
selecting a valid week number from among the plurality of week number candidates by eliminating at least any week number candidate where the application of the solution algorithm has not yielded a solution, assigning a deviation value to any remaining week number and selecting the valid week number, from among the remaining week numbers according to the deviation value, and
designating the solution of the system of equations based on the valid week number as the determined set of device parameters.

13. The machine-readable medium of claim 12, wherein the week number candidate having the absolute value of the deviation value that is smallest is selected as the valid week number.

14. The machine-readable medium of claim 12, wherein the system of equations is based on equations defining the dependence of a pseudorange between each one of the satellites and the mobile device on the set of device parameters.

15. A mobile device comprising:
a processor configured to determine a set of device parameters defining the position of a mobile device from signals received from satellites pertaining to a global navigation satellite system, where code phases of said signals are assessed and the position of the mobile device is derived from said code phases and a system time of the global navigation satellite system comprising a week number (WN) and a time of week (TOW) and assumptions on the trajectories of said satellites which depend on said system time, by resolving a system of equations using a solution algorithm,
the processor further configured to solve the system of equations by using the solution algorithm for each of a plurality of attempts with a system time comprising one of a plurality of week number candidates,
the processor further configured to select a valid week number from among the plurality of week number candidates by eliminating at least any week number candidate where the application of the solution algorithm has not yielded a solution, assigning a deviation value to any remaining week number and selecting the valid week number from among the remaining week numbers according to the deviation value, and
the processor further configured to designate the solution of the system of equations based on the valid week number as the determined set of device parameters.

* * * * *